July 13, 1937.   T. L. HARBORNE   2,086,937
METHOD OF ADDING A DISINFECTANT, ETC., TO A BODY OF WATER
Filed Sept. 5, 1935
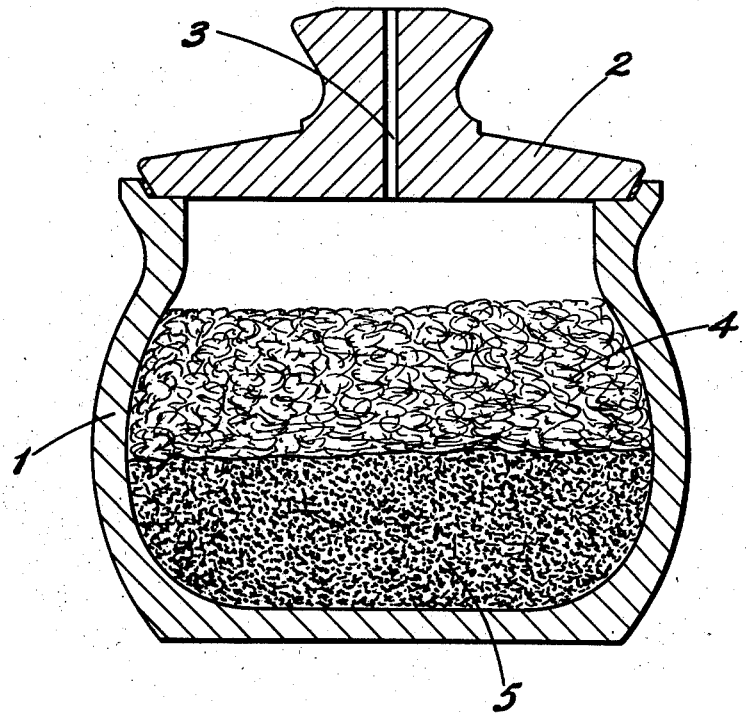
INVENTOR
THOMAS L. HARBORNE
BY Carroll Bailey
ATTORNEY Patented July 13, 1937

2,086,937

UNITED STATES PATENT OFFICE 2,086,937

METHOD OF ADDING A DISINFECTANT, ETC., TO A BODY OF WATER

Thomas Llewellyn Harborne, Yatton, England, assignor to Osmotas Sanitary Service Limited, Bristol, England, a British company Application September 5, 1935, Serial No. 39,358
In Great Britain September 11, 1934

1 Claim. (Cl. 4—228)

This invention has reference to an improved method of and means for adding a disinfectant and/or other fluid to a body of water, such as that contained in a tank for flushing lavatories, water closets and the like. The object of the invention is to provide an extremely simple method and means for effecting the above without the need for mechanical or other operation on the part of the user of the flushing tank or the like, and in an economical manner whereby the disinfectant, deodorant or other substance is slowly released into the water lasting over a long period of weeks or even months before replenishment is necessary.

According to the invention, a method of continuously, gradually, and automatically feeding a disinfectant or/and other substance to a body of water contained in a tank or the like, consists in immersing a sealed porous or partly porous receptacle in the body of water, said receptacle having a vent hole and being charged with the disinfectant or/and other substance, and thereby causing the receptacle contents to mingle slowly with the water body by osmosis through the wall of the receptacle.

For the above purpose, in one way of carrying out the invention, for example, a pot or container, constructed of partly or wholly unglazed pottery in such a manner that it is porous, is fitted with a water-tight cover having a small vent hole.

The pot is of such dimensions that it can be completely submerged in the water contained in the flushing cistern.

It will be seen that, when the pot is charged with the disinfecting and deodorizing fluid, owing to its porous construction, the disinfectant will slowly mingle with the water in the cistern by osmosis, and ultimately pass to the drains when the flush is operated.

The rate of percolation, and therefore the amount of disinfectant and deodorizer added to the flushing water, is governed by the composition of the material of the pot, and/or the amount of its unglazed area.

The attached drawing shows such a pot, and in said drawing the unglazed body is designated 1, the sealed lid 2, the vent hole 3, whilst 4 and 5 indicate disinfectant and deodorant substances.

The disinfectant and/or deodorant substances preferably are in the form of solids, at least originally, that is, prior to immersion of the pot in water, so that said substance, or substances, do not percolate through the walls of the pot when the device is being held in stock for sale or prior to the same actually being immersed in the water to be purified. When the pot, with either or both of the substances 4 and 5 therein, is immersed in water, water enters the pot through the hole 3 as well as through the porous walls of the pot and places the substances 4 and 5 in solution. Little or no direct circulation of water into and from the pot takes place through the hole 3 and, therefore, little or no solution leaves the pot through said hole. On the contrary, after sufficient water has entered the pot, either through the hole 3 or by percolation, to place the substances 4 and 5 in solution, transfer of the solution to the water surrounding the pot is substantially solely by osmotic action. That is to say, water percolates through the walls of the pot into the interior thereof and places the substances 4 and 5 in solution, and this solution percolates through the walls of the pot into the water surrounding the pot.

The vent hole 3 is, as shown, relatively small. Thus, little or no circulation of water into or from the pot through said hole occurs after the pot is submerged and, consequently, little or no solution is lost from the pot through said hole. However, when the pot is submerged, enough water soon enters the pot through the hole to place the substances 4 and 5 in solution, whereby the device becomes operative soon after its immersion and much sooner than it would become operative if the hole 3 were not provided.

I claim:

A container of porous material to be submerged in a body of water and to contain a solid substance to be placed in solution for supply by osmotic action through the porous walls of the container to a body of water in which the container is submerged, said container having a top opening and being otherwise closed and said top opening being small whereby to permit enough water to enter the container to place the substance in solution soon after submergence of the container and substantially to prevent any circulation of water therethrough when the container is submerged so that upon submergence of the container the solution contained therein is supplied to the surrounding body of water substantially solely by osmotic action.

THOMAS LLEWELLYN HARBORNE.